US005974053A

United States Patent [19]

Bennett et al.

[11] Patent Number: 5,974,053

[45] Date of Patent: Oct. 26, 1999

[54] METHOD AND APPARATUS FOR ENCODING AND/OR DECODING A TIME STAMP

[75] Inventors: Jon C. R. Bennett, Ambridge; Fan Zhou, Cranberry, both of Pa.

[73] Assignee: Fore Systems, Inc., Warrendale, Pa.

[ * ] Notice: This patent issued on a continued prosecution application filed under 37 CFR 1.53(d), and is subject to the twenty year patent term provisions of 35 U.S.C. 154(a)(2).

[21] Appl. No.: 08/621,809

[22] Filed: Mar. 22, 1996

[51] Int. Cl.$^{6}$ ........ H04J 3/16

[52] U.S. Cl. ........ 370/468; 370/477; 708/204

[58] Field of Search ........ 370/395, 396, 370/397, 399, 413, 414, 465, 468, 477; 364/715.02, 715.03, 715.04, 715.05, 745; 395/2.12, 2.14; 375/257; 708/203–205

[56] References Cited

U.S. PATENT DOCUMENTS

| | | | |
|---|---|---|---|
| 3,872,465 | 3/1975 | Loofbourrow | 340/347 |
| 5,155,772 | 10/1992 | Brandman et al. | 381/32 |
| 5,325,316 | 6/1994 | Koshiba | 364/715.02 |
| 5,337,308 | 8/1994 | Fan | 370/388 |
| 5,483,521 | 1/1996 | Aramaki | 370/396 |
| 5,574,867 | 11/1996 | Khaira | 395/293 |

*Primary Examiner*—Chau Nguyen
*Attorney, Agent, or Firm*—Ansel M. Schwartz

[57] ABSTRACT

The present invention pertains to an apparatus for providing service to entities. The apparatus comprises a server for providing the service. The apparatus also comprises a plurality of entities which require the service of the server. The entities are connected with the server. Additionally, the apparatus comprises a scheduler for scheduling when each of the entities receives the service of the server. The scheduler is connected with the server and the entities. There is a time stamp mechanism for providing a longer-format time stamp to a requesting entity of the plurality of entities whenever the requesting entity requests service from the server. The time stamp mechanism is connected to the scheduler and the server. Moreover, the apparatus comprises means for compressing the longer-format time stamp into a corresponding shorter-format window-based time stamp and storing the shorter-format window based time stamp. The scheduler schedules service by the server of the requesting entity based on the shorter-format window-based time stamp stored in the memory. The present invention pertains to a method for providing service to entities. An apparatus for manipulating a time stamp. A method for manipulating a time stamp.

25 Claims, 2 Drawing Sheets

TIME STAMP, TIME INTERVAL, AND SYSTEM CLOCK
(N IS THE VALUE OF THE EXPONENT OF THE TIME INTERVAL)

METHOD AND APPARATUS FOR ENCODING AND/OR DECODING A TIME STAMP

FIELD OF THE INVENTION

The present invention is related to a method and an apparatus that can encode and/or decode a time stamp. Specifically, the present invention is related to a mechanism that compresses longer-format time stamp, which could be operated by a server in the packet-switching networks, into shorter format window-based time stamp, which dramatically reduces the storage demands required to store the time stamp.

BACKGROUND OF THE INVENTION

A scheduler such as a priority queue is typically used for the cases where the operation order of a number of elements is sorted based on their time stamps in the packet-switching networks. Elements can be any kind of entities such as virtual path connections and virtual channel connections in a broadband network. Each time the element with the smallest/earliest time stamp is scheduled to obtain the control of some kinds of crucial resources such as transmission line in the packet-switching networks.

The binary time stamp has to be long enough such that any two time stamps in the system are comparable, i.e., the precision should cover the possible time stamp overflow in the worst case. In many packet-switching networks, this would require 32-bit binary representation. Regular floating-point representation cannot be used for the time stamp due to the precision lost. Considering that there are tens of thousands of elements in the networks, the internal and external storage to store the time stamps is extremely costly.

The system in the packet-switching networks usually maintains a global virtual clock as the scheduling reference. Each element has a time interval/rate to specify the bandwidth it requests. As an example, by ATM Forum definition, the rate/time interval is represented as a floating-point consisting of 10-bit mantissa and 5-bit exponent. The time stamp for element i is increased as follows:

$$time\_stamp^i_{j+1} = time\_stamp^i_j + time\_interval^i \quad (1)$$

where j is a positive integer and i is a positive integer.

The scheduler usually tries to schedule the elements on time according to their time stamps. Too early or too late might not guarantee Quality of Services and cause other system problems such as buffer overflow. A good service discipline can guarantee an element will be served no later and no earlier than a given upper bound depending on the applications.

The purpose of the present invention is to use a window-based number to encode the time stamp. The proposed compressed number should not cause any precision lost and the encoding/decoding mechanism should be straightforward and easy to implement. The window-based time stamp can dramatically reduce the amount of storage. The present invention could work as the coprocessor and preprocessor of any kinds of scheduler which can guarantee the service delay bound on the elements.

SUMMARY OF THE INVENTION

The present invention pertains to an apparatus for providing service to entities. The apparatus comprises a server for providing the service. The apparatus also comprises a plurality of entities which require the service of the server. The entities are connected with the server. Additionally, the apparatus comprises a scheduler for scheduling when each of the entities receives the service of the server. The scheduler is connected with the server and the entities. There is a time stamp mechanism for providing a longer-format time stamp to a requesting entity of the plurality of entities whenever the requesting entity requests service from the server. The time stamp mechanism is connected to the scheduler and the server. Moreover, the apparatus comprises means for compressing the longer-format time stamp into a corresponding shorter-format window-based time stamp and storing the shorter-format window based time stamp. The scheduler schedules service by the server of the requesting entity based on the shorter-format window-based time stamp stored in the memory.

The present invention pertains to a method for providing service to entities. The method comprises the steps of associating a longer-format time stamp of k-bit with a first entity, where k is a positive integer. Next, there is the step of compressing the longer-format time stamp into a shorter-format window-based time stamp of (m+p)-bit, where m and p are positive integers and k>(m+p). Then, there is the step of storing the shorter-format window-based time stamp in a memory. Next, there is the step of providing service to the entity based on the shorter-format time stamp in the memory.

The present invention pertains to an apparatus for manipulating a time stamp. The apparatus comprises an encoder for compressing a longer-format time stamp of k-bit, where k is a positive integer, into a shorter-format window based time stamp of (m+p)-bit, where m and p are positive integers and k>(m+p) and a time interval associated with the longer-format time stamp is represented by a floating point with m-bit mantissa M and n-bit exponent N, where n is an integer greater than or equal to 0, and the (m+p)-bit shorter-format time stamp corresponds to the $N^{th}$ bit to $(m+p+N-1)^{th}$ bit of the k-bit longer-format time stamp. Additionally, the apparatus comprises a memory in which the shorter-format time stamp is stored. The memory is connected to the encoder to receive the shorter-format time stamp. Preferably, the apparatus comprises a decoder connected to the memory for expanding the shorter-format time stamp into the longer-format time stamp.

The present invention pertains to a method for manipulating a time stamp. The method comprises the steps of including a k-bit longer-format time stamp into an (m+p)-bit shorter-format window-based time stamp by taking the $N^{th}$ bit to $(m+p+N-1)^{th}$ bit of k-bit longer-format time stamp to form the (m+p)-bit, where a time interval associated with the longer-format time stamp is represented by a floating point with m-bit mantissa M and n-bit exponent N, where k>(m+p), and m and n and p and k are positive integers greater than or equal to 0, and p is a reference bit. Next, there is the step of storing the shorter-format time stamp in a memory. Preferably, after the storing step, there is the step of decoding the shorter-format time stamp into the longer-format time stamp before being used by the scheduler.

BRIEF DESCRIPTION OF THE DRAWINGS

In the accompanying drawings, the preferred embodiment of the invention and preferred methods of practicing the invention are illustrated in which.

DESCRIPTION OF THE PREFERRED EMBODIMENT

Figure 1A:
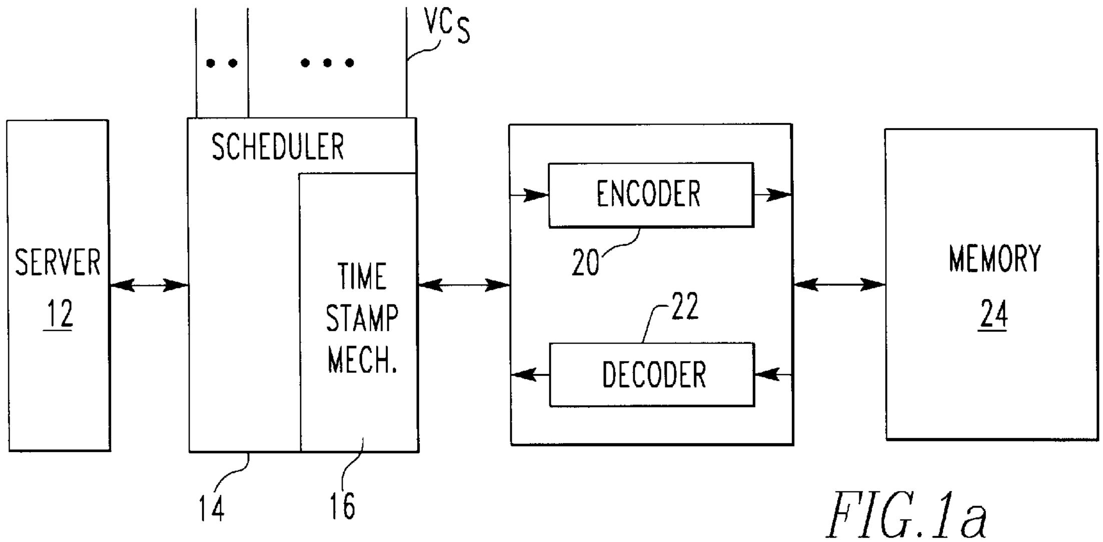
FIGS. 1*a,* 1*b,* 1*c* and 1*d* are schematic representations of an apparatus for providing service to entities, an encoder thereof, a decoder, and a scheduler thereof, respectively.
Figure 1B:
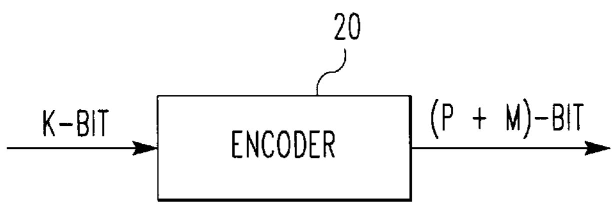
Figure 1C:
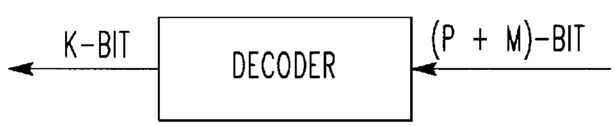
Figure 1D:
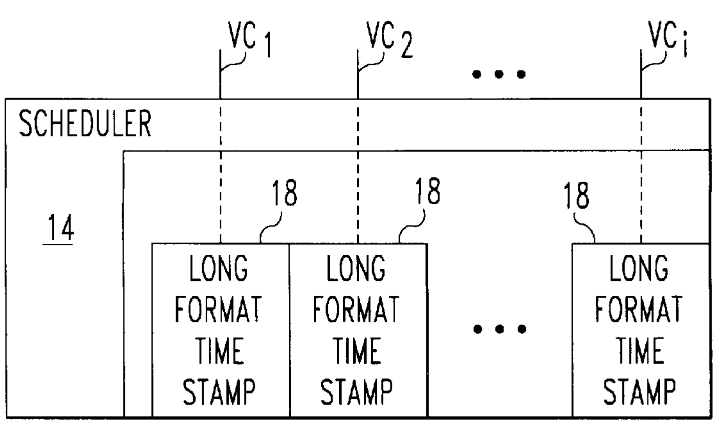

Referring now to the drawings wherein like reference numerals refer to similar or identical parts throughout the several views, and more specifically to FIGS. 1*a,* 1*b,* 1*c* and 1*d* thereof, there is shown an apparatus 10 for providing service to entities. The apparatus 10 comprises a server 12 for providing the service. The apparatus 10 also comprises a plurality of entities which require the service of the server 12. The entities are connected with the server 12. Additionally, the apparatus 10 comprises a scheduler 14 for scheduling when each of the entities receives the service of the server 12. The scheduler 14 is connected with the server 12 and the entities. There is a time stamp mechanism 16 for providing a longer-format time stamp 18 to a requesting entity of the plurality of entities whenever the requesting entity requests service from the server 12. The time stamp mechanism 16 is connected to the scheduler 14 and the server 12. Moreover, the apparatus 10 comprises means for compressing the longer-format time stamp 18 into a corresponding shorter-format window-based time stamp and storing the shorter-format window based time stamp. The scheduler 14 schedules service by the server 12 of the requesting entity based on the shorter-format window-based time stamp stored in the memory 24. Preferably the apparatus 10 includes a memory 24 in which the shorter-format window-based time stamp is stored. The memory 24 is connected to the compressing means.

Figure 2:
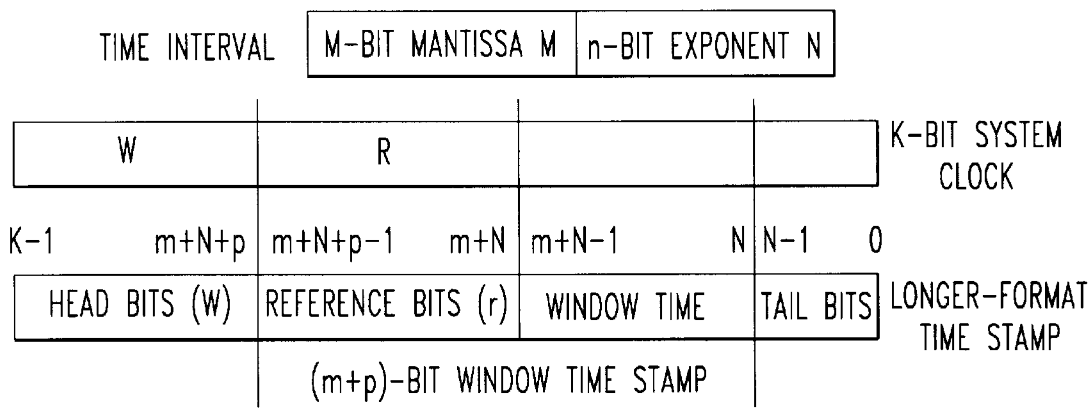
FIG. 2 is a schematic representation of a longer-format time stamp relative to a shorter-format window-based time stamp.

Referring to FIG. 2, preferably, the time stamp mechanism 16 increases time by a time interval represented as a floating point with m-bit mantissa M and n-bit exponent N, where m and n are integers greater than or equal to 0. Additionally, the longer-format time stamp 18 is preferably k-bit where k>m+n and the k-bit longer-format time stamp 18 provided by the time stamp mechanism 16 is longer than the shorter-format window-based time stamp with the shorter-format window-based time stamp represented by (m+p)-bit, where the p-bit is a reference bit. The time stamp mechanism 16 preferably includes a plurality of longer-format time stamps with one of the plurality of longer-format time stamps connected with a corresponding one of the plurality of entities to provide a longer-format time stamp to a corresponding entity.

As shown in FIGS. 1*a*–1*d,* the compressing means preferably includes an encoder 20 which takes the $N^{th}$ bit to $(m+p+N-1)^{th}$ bit of the k-bit longer-format time stamp 18 as the (m+p)-bit shorter format window based time stamp. Preferably, the scheduler 14 guarantees the requesting entity i of the plurality of entities, where i is an integer greater than or equal to 1, is scheduled for service by the server 12 in a time frame defined by $$-v^{*}time\_interval_i \le current\_system\_clock - scheduled\_time \le u^{*}time\_interval_i;$$

and where $u \geqq 0$, $v \geqq 0$.

Alternatively, $$-v^{*}time\_interval_i < current\_system\_clock - scheduled\_time < u^{*}time\_interval_i$$

$$-v^{*}time\_interval_i \le current\_system\_clock - scheduled\_time < u^{*}time\_interval_i$$

$$-v^{*}time\_interval_i < current\_system\_clock - scheduled\_time \le u^{*}time\_interval_i.$$

Preferably, the p-bit reference bit provided by the time stamp mechanism 16 is the smallest value of p which satisfies $2^P>(u+v)$ .

The apparatus 10 preferably also includes a decoder 22 which converts the (m+p)-bit shorter-format time stamp into the k-bit longer-format time stamp 18. The decoder 22 is connected to the scheduler 14 and the memory 24. Preferably, the decoder 22 converts the (m+p)-bit shorter-format time stamp into the k-bit longer-format time stamp. Referring to FIG. 2, by filling the lower N bits (tail bits) of the k-bit with zeros, the m-bit part (window time part) of the k-bit with the m-bit in the shorter-format window-based time stamp, the p-bit reference bit of the k-bit longer-format time stamp with the p-bit reference bit in the shorter-format window-based time stamp and the upper (k-m-N-p) bits (head bits) of the k-bit longer-format time stamp 18 with reference to a global time maintained by the time stamp mechanism 16. Preferably, k=32, m=10,n=5,p=3, u=2, v=4 and the shorter-format time stamp is 13-bit.

The present invention pertains to a method for providing service to entities. The method comprises the steps of associating a longer-format time stamp of k-bit with a first entity, where k is a positive integer. Next, there is the step of compressing the longer-format time stamp into a shorter-format window-based time stamp of (m+p)-bit, where m and p are positive integers and k>(m+p). Then, there is the step of storing the shorter-format window-based time stamp in a memory 24. Next, there is the step of providing service to the entity based on the shorter-format time stamp in the memory 24.

Preferably, after the storing step, there is the step of expanding the shorter-format time stamp into the longer-format time stamp. Additionally, the providing step preferably includes the step of providing service by a server 12 to the entity based on the longer-format time stamp that has been expanded from the shorter-format time stamp in the memory 24.

After the associating step, there are preferably the steps of associating a second k-bit longer-format time stamp with a second entity. Next, there is the step of compressing the second longer-format time stamp into a second (m+p)-bit shorter-format window-based time stamp. Then, there is the step of storing a second shorter-format time stamp in the memory 24. The compressing step preferably includes the step of forming the shorter-format (m+p)-bit time stamp from the $N^{th}$ bit to $(m+N+p-1)^{th}$ bit of the k-bit longer-format time stamp.

The expanding step preferably includes the step of expanding the second shorter-format time stamp into the longer-format time stamp and the second longer-format time stamp, respectively. Additionally, after the providing step, there are preferably the steps of compressing the second longer-format time stamp back into the second shorter-format time stamp. Next, there is the step of storing the second shorter-format time stamp in the memory 24.

The providing step preferably includes the step of providing service by the server 12 to either the entity or the second entity based on the longer-format time stamp or the second longer-format time stamp that has been expanded from the shorter-format time stamp or the second shorter-format time stamp, respectively. Also, the providing step preferably includes the step of increasing time by a time interval represented as a floating point with m-bit mantissa M and n-bit exponent N, where m and n are integers greater than or equal to 0, and p is a reference bit of the k-bit longer-format time stamp. Preferably, the providing step includes the step of providing service to the entity i, where i is an integer ≧1, in a time frame defined by $$-v^{*}time\_interval_i \leq current\_system\_clock - scheduled\_time \leq u^{*}time\_interval_i;$$

and where u≧0, v≧0.

The present invention pertains to an apparatus 10 for manipulating a time stamp. The apparatus 10 comprises an encoder 20 for compressing a longer-format time stamp of k-bit, where k is a positive integer, into a shorter-format window based time stamp of (m+p)-bit, where m and p are positive integers and k>(m+p) and a time interval associated with the longer-format time stamp is represented by a floating point with m-bit mantissa M and n-bit exponent N, where n is an integer greater than or equal to 0, and the (m+p)-bit shorter-format time stamp corresponds to the $N^{th}$ bit to $(m+N+p-1)^{th}$ bit of the k-bit longer-format time stamp. Additionally, the apparatus 10 comprises a memory 24 in which the shorter-format time stamp is stored. The memory 24 is connected to the encoder 20 to receive the shorter-format time stamp. Preferably, the apparatus 10 comprises a decoder 22 connected to the memory 24 for expanding the shorter-format time stamp into the longer-format time stamp.

The present invention pertains to a method for manipulating a time stamp. The method comprises the steps of including a k-bit longer-format time stamp into an (m+p)-bit shorter-format window-based time stamp by taking the $N^{th}$ bit to (m+N+p−1)th bit of k-bit longer-format time stamp to form the (m+p)-bit, where a time interval associated with the longer-format time stamp is represented by a floating point with m-bit mantissa M and n-bit exponent N, where k>(m+p), and m and n and p and k are positive integers greater than or equal to 0, and p is a reference bit. Next, there is the step of storing the shorter-format time stamp in a memory 24. Preferably, after the storing step, there is the step of decoding the shorter-format time stamp into the longer-format time stamp.

In regard to the operation of the preferred embodiment, suppose that the time interval is represented as floating-point with m-bit mantissa and n-bit exponent. K-bit system clock and uncompressed time stamp is longer than (m+p) -bit compressed window time stamp. An external scheduler 14 guarantees that an element i is scheduled in the following time frame:

$$-v^{*}time\_interval_i \leq current\_system\_clock - scheduled\_time \leq u^{*}time\_interval_i; \quad (2)$$

(It should be noted that the time frame can also be $$-v^{*}time\_interval_i < current\_system\_clock - scheduled\_time < u^{*}time\_interval_i$$

$$-v^{*}time\_interval_i \le current\_system\_clock - scheduled\_time < u^{*}time\_interval_i$$

$$-v^{*}time\_interval_i < current\_system\_clock - scheduled\_time \le u^{*}time\_interval_i)$$

The k-bit time stamp consists of four parts: tail bits, window time, reference bits, and head bits, as shown in FIG. 2. The n-bit tail bits are always zeroes if a floating-point number with n-bit exponent N is converted into a fixed-point number; The m-bit window time is the part corresponding to m-bit mantissa M. It is changed when the time stamp is updated; p-bit reference bit is used to infer upper head bits since the external scheduler 14 can guarantee that an element is served in a given time interval range. The head bits is the part which does not need to be stored.

Encoder

Simply take the $N^{th}$ bit to $(m+N+p-1)^{th}$ bit of the k-bit uncompressed time stamp as the (m+p)-bit window time stamp. The lower N bits do not need to be saved since they are zeroes. The upper (k-m-N-p) bits do not need to be stored either since they could be inferred by the reference bits and system clock.

Reference Bits

The p-bit reference bits are used to infer the upper (k-m-N-p) bits of the window time stamp from the current system clock. To compare the p-bit reference bit with the counterpart in the system clock (i.e., p-bit value in the same position of the system clock), p should be long enough to cover all possible differences between the reference bits and the corresponding part in the system clock. The value p is the smallest p which satisfies:

$$2^{p}>(u+v);$$

Decoder

To decode the (m+p)-bit window time stamp into k-bit time stamp, the following steps are followed:

For giving exponent value n of the time interval, the tail bits (lower N bits) are filled with zeroes. N might be any number from 0 to $2^{n}-1$. If it is zero, no zero is filled in the lower part;

The m-bit window time part is filled with the m-bit window time in the window time stamp;

The p-bit reference bits r is filled with the p-bit reference bits in the window time stamp;

The head bits w (upper (k-m-N-p) bits) are formed as follows:

```
if((R>=r) and (R-r) < u) or ((r>=R) and (r-R)<v) then
/* take the upper parts of the system clock directly*/
w<=W;
elsif (r>R) and ((R-r)mod 2^p)<u) then
w<= W-1;
elsif (R>r) and ((r-R)mod 2^p)<v) then
w<= W+1;
end if;
```

where R is the counterpart of reference bits in the system clock and W is the counterpart of head bits in the system clock.

In an ATM network, a general scheduler 14 will pick a virtual connection to be served by a server 12, among hundreds of thousands of virtual connections (VCs), based on a time stamp, as shown in FIG. 1. There are hundreds of thousands of time stamps which need to be stored. The time stamp usually is pretty long (for example, 32 bit) and will cause a large amount of memory 24 to be needed. Storing these time stamps, compressedly and efficiently would save storage and search time dramatically.

The VCs are connected to the scheduler 14. Each VC receives a time stamp from the time stamp mechanism 16 connected with the scheduler 14, as is well known in the art, every cycle, whether the VC is actually in need of service by the server 12 at the time, or not. The time stamp for each VC, which is k-bit (longer format) is provided to an encoder 20 which is connected to the scheduler 14. The encoder 20 compresses the k-bit longer-format time stamp 18 into an (m+p) bit shorter-format window-based time stamp. In this embodiment, the rate/time interval by which time is increased is represented by a floating point with an m-bit mantissa M and an n-bit exponent N, where m and n are integers ≧0, where k>m+n and the p-bit of the k-bit is a reference bit where p is the smallest value of p which satisfies $2^{p}>(u+v)$. The scheduler 14 guarantees the requesting entity i, where i is an integer ≧1, is scheduled for service by the server 12 in a time frame defined by $$-v^{*}time\_interval_i \leq current\_system\_clock - scheduled\_time \leq u^{*}time\_interval_i$$

and where $u \geqq 0$, $v \geqq 0$.

The encoder 20 receives a time stamp from the scheduler 14 and compresses it into the shorter-format time stamp. Once compressed, the shorter-format time stamp is stored in the memory 24. Each time the time stamps of the VCs need to be reviewed and compared so the server 12 knows which VC to serve next, all the VCs are decoded into the longer-format time stamp 18 by the decoder 22 and compared. Typically, this is done every cycle. After the appropriate VC is selected for service by some criteria, the time stamp of the VC selected is increased by a time interval and encoded again by the encoder 20 into the shorter-format time stamps and stored in the memory 24.

In the ATM networks, suppose the system clock and time stamp is 32-bit wide. The time interval is a 15-bit floating-point with 5-bit exponent and 10-bit mantissa. The service discipline can guarantee that a virtual connection will be served no later than 4 time intervals and no earlier than 2 time intervals referring to the system clock. The reference bit is 3-bit long so that the window time stamp is 13-bit instead of 32-bit. This results in a savings of 19-bit per connection!

k=32 v=4 u=2 m=10 n=5 p=3

Some additional examples to better understand the invention are now described. Generally, only certain portions of a number are critical for a given application. An example of this is for numbers associated with an interval. Those parts of the number not part of the interval are not necessarily important. Those parts of the number associated with the interval are important. For instance, if system time V=049,000 of a possible 100,000 with an interval of 3,000 and an increment of 1,000 for service, then only a time between 046,000 and 052,000 is of interest because all service is to be provided within the interval of 3,000 in regard to 049,000. Thus, only the 1,000's column and the 10,000's column need be saved since increments can only occur by 1,000, and the range can only be 3,000 from 49,000. Another way of looking at the invention is, if system time v=500,000 with an interval of 30,000 and an increment of 10,000, then an encoded number of $X_{-1}9000X_{-2}$ must be 490,000 because if $X_1=5$, then 590,000 is outside the interval which 500,000 is in.

What is described herein allows the comparison of two numbers one of which is smaller in size than the other, and where the difference between the two numbers (when the physically smaller number is increased in size to be the same as the larger number) is bounded by a third number. In the descriptions shown, these two numbers are described as a "system time" and a "service time", and for use in say a scheduler 14, all "service times" are increased in size to that of the "system time" and then compared to each other.

This method can be used for implementing scheduling policies that can tightly bound the difference between an entities "service time" and the "system time". However, this requires decoding the "service time" so that it can be compared at a "full size" number. If a policy were used that selected entities for service based on the 'normalized difference' between the "service time" and the "system time", then no decoding would be required. For instance:

if ENCODE(t,i) produces an appropriately encoded time stamp for entity 'i' given the time 't'. Then an example of such a policy would be to select for service the entity 'i' such that (ENCODE(system_time,i)—scheduled_time_i) is the smallest over all entities, and where the subtraction is done in binary numbers of the same size as the number of bits in "scheduled time", and where these numbers are considered 'signed' i.e. the high order bit is the sign bit. For example:

in binary

111−001=110 again in decimal

−1−1=−2

This works because the encoding process has in effect performed a crude form of normalization (it may be off by a factor of 2, however this can be corrected without performing a decoding step).

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. An apparatus for providing service to entities comprising:

- a server for providing the service;
- a plurality of entities which require the service of the server, said entities connected with the server;
- a scheduler for scheduling when each of the entities receives the service of the server, said scheduler connected with the server and the entities;
- a time stamp mechanism for providing a longer-format time stamp to a requesting entity of the plurality of entities whenever the requesting entity requests service from the server, said time stamp mechanism connected to the scheduler and the server;
- means for compressing the longer-format time stamp into a corresponding shorter-format window-based time stamp while not causing any precision lost and storing the shorter-format window-based time stamp and wherein the compressing means includes an uncompressing means which uncompresses the shorter-format window-based time stamp back into exactly the longer-format time stamp without any precision lost; and
- a memory in which the shorter-format window-based time stamp is stored, the memory connected to the compressing means, said scheduler scheduling service by the server of the requesting entity based on the longer-format time stamp obtained from the shorter-format window-based time stamp stored in the memory the time stamp mechanism increases time by a time interval represented as a floating point with m-bit mantissa M and n-bit exponent N, where m and n are integers greater than or equal to 0, the longer-format time stamp is k-bit where k≧m+n and the k-bit longer-format time stamp provided by the time stamp mechanism is longer than the shorter-format window-based time stamp with said shorter-format window-based time stamp represented by (m+p)-bit, where the p-bit is a reference bit.

2. An apparatus as described in claim 1 wherein the compressing means includes an encoder which takes the $N^{th}$ bit to (m+N+p−1)th bit of the k-bit longer-format time stamp as the (m+p)-bit shorter-format window time stamp.

3. An apparatus as described in claim 2 wherein the scheduler guarantees the requesting entity i of the plurality of entities, where i is an integer ≧1, is scheduled for service by the server in a time frame defined by $$-v^* time\_interval_i \le current\_system\_clock - scheduled\_time \le u^* time\_interval_i;$$

and where u≧0, v≧0.

4. An apparatus as described in claim 3 wherein the p-bit reference bit provided by the time stamp mechanism is the smallest value of p which satisfies $2^p$>(u+v).

5. An apparatus as described in claim 4 wherein the uncompressing means includes a decoder which converts the (m+p)-bit shorter-format time stamp into the k-bit longer-format time stamp, said decoder connected to the scheduler and the memory.

6. An apparatus as described in claim 5 wherein the decoder converts the (m+p)-bit shorter-format time stamp into the k-bit longer-format time stamp by filling the lower N bits of the k-bit with zeros, the m-bit part of the k-bit with the m-bit in the shorter-format window-based time stamp, the p-bit reference bits of the k-bit longer-format time stamp with the p-bit reference bits in the shorter-format window-based time stamp and the upper (k-m-N-p) bits of the k-bit longer-format time stamp with reference to a global time maintained by the time stamp mechanism.

7. An apparatus as described in claim 6 wherein the time stamp mechanism includes a plurality of longer-format time stamps with one of the plurality of longer-format time stamps connected with a corresponding one of the plurality of entities to provide a longer-format time stamp to the corresponding entity.

8. An apparatus as described in claim 7 wherein k=32, m=10 and n=5.

9. An apparatus as described in claim 8 wherein p=3, u=2, v=4 and the shorter-format time stamp is 13-bit.

10. An apparatus as described in claim 2 wherein the scheduler guarantees the requesting entity i of the plurality of entities, where i is an integer ≧1, is scheduled for service by the server in a time frame defined by $$-v^* time\_interval_i < current\_system\_clock - scheduled\_time < u^* time\_interval_i;$$

and where u≧0, v≧0.

11. An apparatus as described in claim 2 wherein the scheduler guarantees the requesting entity i of the plurality of entities, where i is an integer ≧1, is scheduled for service by the server in a time frame defined by $$-v^*time\_interval_i \le current\_system\_clock - scheduled\_time < u^*time\_interval_i;$$ and where u≧0, v≧0.

12. An apparatus as described in claim 2 wherein the scheduler guarantees the requesting entity i of the plurality of entities, where i is an integer ≧1, is scheduled for service by the server in a time frame defined by $$-v^*time\_interval_i < current\_system\_clock - scheduled\_time \le u^*time\_interval_i;$$ and where u≧0, v≧0.

13. A method for providing service to entities comprising the steps of:

associating a longer-format time stamp of k-bit with a first entity, where k is a positive integer;

compressing the longer-format time stamp into a shorter-format window-based time stamp of (m+p)-bit while not causing any precision lost, where m and p are positive integers and k>(m+p);

storing the shorter-format window-based time stamp in a memory;

associating a second k-bit longer-format time stamp with a second entity;

compressing the second longer-format time stamp into a second (m+p)-bit shorter-format window-based time stamp:

storing the second shorter-format time stamp in the memory:

expanding the shorter-format time stamp and the second shorter-format time stamp into the longer-format time stamp and the second longer-format time stamp respectively;

providing service by a server to either the entity or the second entity based on the longer-format time stamp or the second longer-format time stamp that has been expanded from the shorter-format time stamp or the second shorter-format time stamp, respectively;

compressing the second longer-format time stamp back into the second shorter-format time stamp;

storing the second shorter-format time stamp in the memory; and increasing time by a time interval represented as a floating point with m-bit mantissa and n-bit exponent, where m and n are integers greater than or equal to 0, and p is a reference bit of the k-bit longer-format time stamp.

14. A method as described in claim 13 wherein the compressing step includes the step of forming the shorter-format (m+p)-bit time stamp from the $N^{th}$ bit to $(m+N+p-1)^{th}$ bit of the k-bit longer-format time stamp.

15. A method as described in claim 14 wherein the providing step includes the step of providing service to the entity i, where i is an integer ≧1, in a time frame defined by $$-v^{*}time\_interval_i \leq current\_system\_clock - scheduled\_time \leq u^{*}time\_interval_i;$$

and where u≧0, v≧0.

16. An apparatus for manipulating a time stamp comprising:

an encoder/decoder for compressing a longer-format time stamp of k-bit, where k is a positive integer, into a shorter-format window based time stamp of (m+p)-bit while not causing any precision lost and for uncompressing the shorter-format window-based time stamp back into the longer-format time stamp while not causing any precision lost, where m and p are positive integers and k>(m+p) and a time interval associated with the longer-format time stamp is represented by a floating point with m-bit mantissa and n-bit exponent, where n is an integer ≧0, and the (m+p)-bit shorter-format time stamp corresponds to the $N^{th}$ bit to $(m+N+p-1)^{th}$ bit of the k-bit longer-format time stamp and the k-bit longer-format time stamp comprises n-bit tail bits, m-bit window time corresponding to the m-bit mantissa M, p-bit reference bit, and head bits; and a memory in which the shorter-format time stamp is stored, said memory connected to the encoder to receive the shorter-format time stamp.

17. An apparatus as described in claim 16 including a decoder connected to the memory for expanding the shorter-format time stamp into the longer-format time stamp.

18. A method for manipulating a time stamp comprising the steps of:

encoding a k-bit longer-format time stamp into an (m+p)-bit shorter-format window-based time stamp while not causing any precision lost by taking the $N^{th}$ bit to $(m+N+p-1)^{th}$ bit of k-bit longer-format time stamp to form the (m+p)-bit, where a time interval associated with the longer-format time stamp is represented by a floating point with m-bit mantissa and n-bit exponent, where k>(m+p), and m and n and p and k are positive integer numbers greater than or equal to 0, and p is a reference bit, and the k-bit longer-format time stamp comprises n-bit tail bits, m-bit window time corresponding to the m-bit mantissa M, p-bit reference bit, and head bits;

storing the shorter-format time stamp in a memory; and decoding the shorter-format window-based time stamp into the longer-format time stamp while not causing any precision lost.

19. A method as described in claim 18 including after the storing step, there is the step of decoding the shorter-format time stamp into the longer-format time stamp.

20. An apparatus for providing service to VC connections of an ATM network comprising:

a server of the ATM network for providing the service;

a plurality of VC connections of the ATM network which require the service of the server, said connections connected with the server;

a scheduler of the ATM network for scheduling when each of the connections receives the service of the server, said scheduler connected with the server and the connections;

a time stamp mechanism for providing a longer-format time stamp to a requesting VC connection of the plurality of VC connections whenever the requesting connection requests service from the server, said time stamp mechanism connected to the scheduler and the server; and a mechanism for compressing the longer-format time stamp into a corresponding shorter-format time stamp while not causing any precision lost and storing the shorter-format time stamp, said scheduler scheduling service by the server of the requesting connection based on the shorter-format time stamp; and a memory in which the shorter-format time stamp is stored, said memory connected to the compressing means, said scheduler scheduling service by the server of the requesting entity based on the shorter-format window-based time stamp stored in the memory.

21. An apparatus for providing service to entities comprising:

a server for providing the service;

a plurality of entities which require the service of the server, said entities connected with the server;

a scheduler for scheduling when each of the entities receives the service of the server, said scheduler connected with the server and the entities wherein the scheduler guarantees the requesting entity i of the plurality of entities, where i is an integer ≧1, is scheduled for service by the server in a time frame defined by $$-v^{*}time\_interval_i<current\_system\_clock-scheduled\_time<u^{*}time\_interval_i;$$ and where u≧0, v≧0;

a time stamp mechanism for providing a longer-format time stamp to a requesting entity of the plurality of entities whenever the requesting entity requests service from the server, said time stamp mechanism connected to the scheduler and the server wherein the time stamp mechanism increases time by a time interval represented as a floating point with m-bit mantissa M and n-bit exponent N, where m and n are integers greater than or equal to 0, the longer-format time stamp is k-bit where k≧m+n and the k-bit longer-format time stamp provided by the time stamp mechanism is longer than the shorter-format window-based time stamp with said shorter-format window-based time stamp represented by (m+p)-bit, where the p-bit is a reference bit;

means for compressing the longer-format time stamp into a corresponding shorter-format window-based time stamp while not causing any precision lost and storing the shorter-format window-based time stamp, wherein the compressing means includes an encoder which takes the $N^{th}$ bit to $(m+N+p-1)^{th}$ bit of the k-bit longer-format time stamp as the (m+p)-bit shorter-format window time stamp; and a memory in which the shorter-format window-based time stamp is stored, the memory connected to the compressing means, said scheduler scheduling service by the server of the requesting entity based on the shorter-format window-based time stamp stored in the memory.

22. An apparatus for providing service to entities comprising:

a server for providing the service;

a plurality of entities which require the service of the server, said entities connected with the server;

a scheduler for scheduling when each of the entities receives the service of the server, said scheduler connected with the server and the entities wherein the scheduler guarantees the requesting entity i of the plurality of entities, where i is an integer ≧1, is scheduled for service by the server in a time frame defined by $$-v{*}time\_interval_i \leqq current\_system\_clock - scheduled\_time < u{*}time\_interval_i; \text{ and}$$

where u≧0, v≧0;

a time stamp mechanism for providing a longer-format time stamp to a requesting entity of the plurality of entities whenever the requesting entity requests service from the server, said time stamp mechanism connected to the scheduler and the server wherein the time stamp mechanism increases time by a time interval represented as a floating point with m-bit mantissa M and n-bit exponent N, where m and n are integers greater than or equal to 0, the longer-format time stamp is k-bit where k≧m+n and the k-bit longer-format time stamp provided by the time stamp mechanism is longer than the shorter-format window-based time stamp with said shorter-format window-based time stamp represented by (m+p)-bit, where the p-bit is a reference bit;

means for compressing the longer-format time stamp into a corresponding shorter-format window-based time stamp while not causing any precision lost and storing the shorter-format window-based time stamp, wherein the compressing means includes an encoder which takes the $N^{th}$ bit to $(m+N+p-1)^{th}$ bit of the k-bit longer-format time stamp as the (m+p)-bit shorter-format window time stamp; and a memory in which the shorter-format window-based time stamp is stored, the memory connected to the compressing means, said scheduler scheduling service by the server of the requesting entity based on the shorter-format window-based time stamp stored in the memory.

23. An apparatus for providing service to entities comprising:

a server for providing the service;

a plurality of entities which require the service of the server, said entities connected with the server;

a scheduler for scheduling when each of the entities receives the service of the server, said scheduler connected with the server and the entities wherein the scheduler guarantees the requesting entity i of the plurality of entities, where i is an integer ≧1, is scheduled for service by the server in a time frame defined by $$-v^{*}time\_interval_i < current\_system\_clock - scheduled\_time < u^{*}time\_interval_i;$$

and where u≧0, v≧0;

a time stamp mechanism for providing a longer-format time stamp to a requesting entity of the plurality of entities whenever the requesting entity requests service from the server, said time stamp mechanism connected to the scheduler and the server wherein the time stamp mechanism increases time by a time interval represented as a floating point with m-bit mantissa M and n-bit exponent N, where m and n are integers greater than or equal to 0, the longer-format time stamp is k-bit where k≧m+n and the k-bit longer-format time stamp provided by the time stamp mechanism is longer than the shorter-format window-based time stamp with said shorter-format window-based time stamp represented by (m+p)-bit, where the p-bit is a reference bit;

means for compressing the longer-format time stamp into a corresponding shorter-format window-based time stamp while not causing any precision lost and storing the shorter-format window-based time stamp, wherein the compressing means includes an encoder which takes the $N^{th}$ bit to $(m+N+p-1)^{th}$ bit of the k-bit longer-format time stamp as the (m+p)-bit shorter-format window time stamp; and a memory in which the shorter-format window-based time stamp is stored, the memory connected to the compressing means, said scheduler scheduling service by the server of the requesting entity based on the shorter-format window-based time stamp stored in the memory.

24. An apparatus for providing service to entities comprising:

a server for providing the service;

a plurality of entities which require the service of the server, said entities connected with the server;

a scheduler for scheduling when each of the entities receives the service of the server, said scheduler connected with the server and the entities;

a time stamp mechanism for providing a longer-format time stamp of k-bit, where k is a positive integer to a requesting entity of the plurality of entities whenever the requesting entity requests service from the server, said time stamp mechanism connected to the scheduler and the server;

means for compressing the longer-format time stamp into a corresponding shorter-format window-based time stamp of (m+p)-bit, where m and p are positive integers and k>(m+p), while not causing any precision lost, and a time interval associated with the longer-format time stamp is represented by a floating point with m-bit mantissa and n-bit exponent, where n is an integer $\geqq 0$, and the (m+p)-bit shorter-format time stamp corresponds to the $N^{th}$ bit to $(m+N+p-1)^{th}$ bit of the k-bit longer-format time stamp and the k-bit longer-format time stamp comprises n-bit tail bits, m-bit window time corresponding to the m-bit mantissa M, p-bit reference bit, and head bits and storing the shorter-format window-based time stamp and wherein the compressing means includes an uncompressing means which uncompresses the shorter-format window-based time stamp back into exactly the longer-format time stamp without any precision lost; and a memory in which the shorter-format window-based time stamp is stored, the memory connected to the compressing means, said scheduler scheduling service by the server of the requesting entity based on the longer-format time stamp obtained from the shorter-format window-based time stamp stored in the memory.

25. A method for providing service to entities comprising the steps of:

associating a longer-format time stamp of k-bit with a first entity, where k is a positive integer;

compressing the longer-format time stamp into a shorter-format window-based time stamp of (m+p)-bit while not causing any precision lost, where m and p are positive integers and k>(m+p), and a time interval associated with the longer-format time stamp is represented by a floating point with m-bit mantissa and n-bit exponent, where n is an integer $\geqq 0$, and the (m+p)-bit shorter-format time stamp corresponds to the $N^{th}$ bit to $(m+N+p-1)^{th}$ bit of the k-bit longer-format time stamp and the k-bit longer-format time stamp comprises n-bit tail bits, m-bit window time corresponding to the m-bit mantissa M, p-bit reference bit, and head bits;

storing the shorter-format window-based time stamp in a memory;

uncompressing the shorter-format window-based time stamp back into the longer-format time stamp from which the shorter-format window-based time stamp was obtained without any precision lost; and providing service to the entity based on the longer-format time stamp obtained from the shorter-format time stamp in the memory.

* * * * *